United States Patent [19]

Simonelli et al.

[11] Patent Number: 4,687,181
[45] Date of Patent: Aug. 18, 1987

[54] METERING VALVE

[75] Inventors: James K. Simonelli, Mentor; Gary W. Scheffel, Streetsboro; Joseph J. Jagielo, Mentor, all of Ohio

[73] Assignee: Nupro Company, Willoughby, Ohio

[21] Appl. No.: 829,208

[22] Filed: Feb. 14, 1986

Related U.S. Application Data

[63] Continuation-in-part of Ser. No. 729,285, May 1, 1985, abandoned.

[51] Int. Cl.$^4$ ............................................. F16K 31/44
[52] U.S. Cl. ...................................... 251/223; 251/264
[58] Field of Search .................... 16/121; 74/552, 553, 74/554; 251/223, 225, 264, 274

[56] References Cited

U.S. PATENT DOCUMENTS

| | | | |
|---|---|---|---|
| 690,797 | 1/1902 | Vail | 285/353 |
| 770,525 | 9/1904 | Hussey | 285/348 |
| 822,530 | 6/1906 | Lowe | 285/353 |
| 866,285 | 9/1907 | Klie | 251/214 |
| 1,660,302 | 2/1928 | Shafer | 277/108 |
| 1,774,196 | 8/1930 | Davis | 285/338 |
| 1,989,083 | 1/1935 | Dahnken et al. | 251/291 |
| 2,310,558 | 2/1943 | Teeters et al. | 251/214 |
| 2,567,527 | 9/1951 | Parks | 251/214 |
| 2,593,193 | 4/1952 | Rockwell | 277/177 |
| 2,666,031 | 10/1882 | Haas | 251/214 |
| 2,917,271 | 12/1959 | Banks | 251/122 |
| 2,980,392 | 4/1961 | Greenwood | 251/210 |
| 3,010,695 | 11/1961 | Banks | 251/223 |
| 3,086,749 | 4/1963 | Frye | 251/205 |
| 3,175,573 | 6/1962 | Vater | 137/312 |
| 3,228,655 | 1/1966 | Weise | 251/122 |
| 3,280,836 | 10/1966 | Callahan, Jr. et al. | 137/614.21 |
| 3,410,521 | 11/1968 | Sowers, III et al. | 251/205 |
| 3,538,951 | 11/1970 | Bownass | 137/614.21 |
| 3,765,448 | 10/1973 | Dussia | 137/553 |
| 3,830,464 | 8/1974 | Parker | 251/269 |
| 3,910,553 | 10/1975 | Boylan | 251/205 |
| 4,134,572 | 1/1979 | Schmidt | 251/122 |

FOREIGN PATENT DOCUMENTS 1515245 1/1968 France .
697388 9/1953 United Kingdom .
953604 3/1964 United Kingdom .

Primary Examiner—Samuel Scott
Assistant Examiner—Noah Kamen
Attorney, Agent, or Firm—Fay, Sharpe, Beall, Fagan, Minnich & McKee

[57] ABSTRACT

A metering valve having a one-piece bonnet for reducing problems resulting from tolerance stack up. A guide portion is included on the nose of the bonnet for cooperation with a valve body bore to ensure concentric alignment between the metering pin and its associated orifice. A pair of O-rings on the valve stem cooperate with the bonnet bore to absorb forces and substantially reduce the potential for galling and breakage of the metering pin. One of the O-rings is compressed to a substantially greater extent than the other to aid in achieving better alignment between the stem and bonnet, and to obtain a firmer feel. A handle is included at the outer end of the valve stem and receives an upper portion of the valve bonnet. A packing is interposed between the handle and valve bonnet upper portion for limiting lateral movement between the handle and valve stem. The packing may be selectively adjusted without altering a preset deadstop position of the valve.

22 Claims, 6 Drawing Figures

4,687,181

METERING VALVE

This is a continuation-in-part of copending application Ser. No. 729,285, filed on May 1, 1985, now abandoned.

BACKGROUND OF THE INVENTION

The subject invention is directed toward the valve art and, more particularly, to a metering valve having improved stability.

The invention is particularly suited for use in a needle type metering valve of the type used for controlling fine flows and will be described with particular reference thereto. However, as will become apparent, the inventive concept presented is capable of broader applications and use.

Valves used for metering fine flows typically comprise a needle member or metering pin carried at the end of a stem and adapted to enter a fluid flow orifice in a valve body between the fluid inlet and outlet. Generally, the stem is threadedly received in a multi-part bonnet member which, in turn, is threadedly secured to the body. Rotation of an associated handle imparts axial movement of the stem and needle member, and regulates fluid flow through the valve. An O-ring or the like is carried on the stem and assists a conventional stem packing for sealing purposes.

In recent years, a quality control study has determined that metering valves of this general type have been failing prematurely due to breakage and galling of the metering pin. It is desirable to extend the cycle life of the metering valves and retain high quality metering after repetitive use. A review of the valve designs found that improvements were obtainable in certain areas, e.g., better alignment of the metering pin in relation to the orifice, reduction of tolerance stacking, better force absorption, and the like. The variation in concentricity and tolerance stacking allowed the metering pin to rub the orifice side wall. This caused the metering pins to break or gall since the resulting forces could not be absorbed by the stem and bonnet assemblies.

Flow instability problems also reulted at low pressure ranges. Variations in flow were not uncommon upon imposition of slight lateral loads on the handle. These flow variations are particularly undesirable when handling toxic or corrosive fluids where a highly accurate, precise flow is required.

A valve arrangement has, therefore, been considered desirable which would provide improved valve life and overcome the foregoing problems. The subject invention is deemed to meet these needs and others, and provides a new and improved metering valve construction.

SUMMARY OF THE INVENTION

According to the invention, a metering valve construction is provided which has a valve body including conventional inlet and outlet passageways communicating with a fluid flow orifice. A stem received in a unitary valve bonnet is selectively moveable axially thereof for, in turn, axially moving a metering pin in the fluid flow orifice. Means for absorbing forces resulting from inadvertent contact between the metering pin and orifice is advantageously provided. A handle is positioned at an outer end of the stem. The handle receives an upper portion of the valve bonnet therein. Means for limiting stem lateral movement is defined between the handle and an exterior surface of the valve bonnet upper portion.

According to another aspect of the invention, the absorbing means preferably comprises a pair of resilient rings closely surrounding the exterior of the stem in the bonnet. The rings are in axial spaced relation to each other with the upper or guide ring spaced furthest from the metering pin being subjected to a much greater compression than the lower or seal ring. In the preferred construction, these rings are defined by O-rings.

In accordance with another aspect of the invention, a guide means is advantageously provided at one end of the bonnet for ensuring accurate alignment of the bonnet to the valve body which, in turn, ensures proper alignment of the metering pin to the orifice. A seal member also is situated between the exterior of the guide means and the valve body.

According to another aspect of the invention, the lateral movement limiting means preferably comprises a packing assembly including an annular polymeric packing, such as polytetrafluorethylene, and a packing gland. The packing assembly is axially and radially compressed between the handle and exterior surface of the valve bonnet upper portion.

In accordance with a still further aspect of the invention, means for adjusting the compression of the packing assembly is advantageously provided. The packing gland is cup-shaped and has a base portion which is engaged by a pair of adjustable set screws.

A principal advantage of the present invention is the provision of a metering valve which achieves better, more reliable concentricity between the metering pin and an associated orifice.

Another advantage of the invention resides in a structural arrangement which better protects the metering pin from various contact forces.

A further advantage of the invention is found in providing the bonnet with a guide means extension to facilitate centering of the metering pin in the valve body orifice.

Another advantage of the invention resides in a structural arrangement that limits lateral movement of the handle relative to the valve stem.

A further advantage of the invention is the provision of adjusting means to alter the compression characteristics of the packing assembly without affecting a preset deadstop position of the valve.

Still further advantages and benefits of the subject invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings wherein.

DETAILED DESCRIPTION OF THE PREFERRED EMBODIMENT

Figure 1:
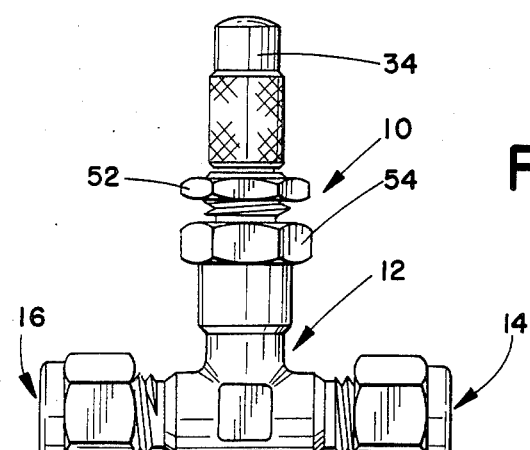
FIG. 1 is an elevational view of a metering valve.
Figure 2:
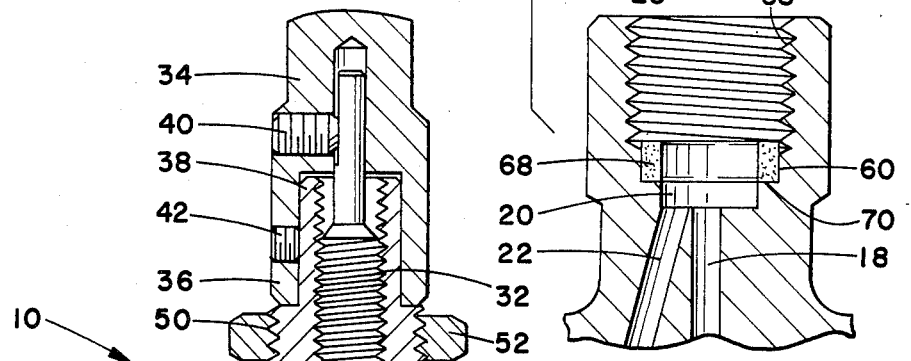
FIG. 2 is an enlarged cross-sectional view of the metering valve of FIG. 1 showing the cooperative relationship of the various components according to the invention.
Figure 2:
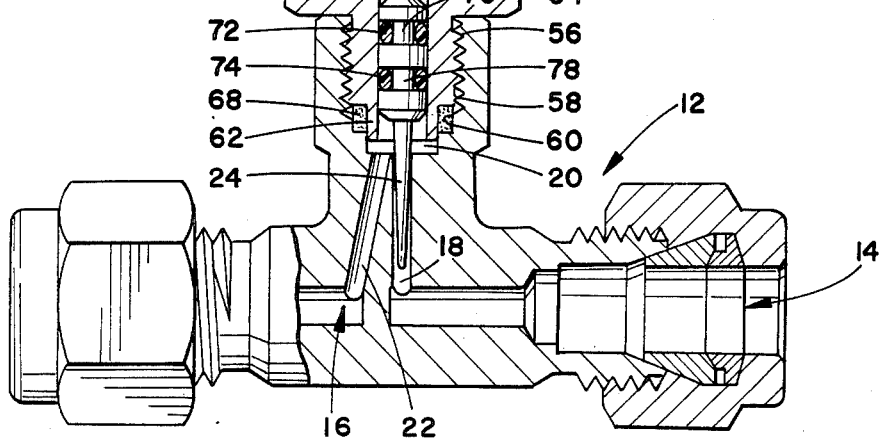

Referring now to the drawings wherein the showings are for purposes of illustrating the preferred embodiment of the invention only, and not for purposes of limiting same, FIGS. 1 and 2 show a metering valve 10 including a body portion 12 having an inlet passageway 14 and an outlet passageway 16. As shown, the inlet and outlet are in opposed axial alignment with each other. Swage type end fittings are received on the valve body in surrounding relation to the outer end areas of passageways 14, 16 to facilitate ready installation of the valve in an associated fluid system. It is to be appreciated, however, that a variety of other end fitting connections could also be suitably employed.

An elongated orifice 18 extends generally normal to inlet and outlet passageways 14, 16 and has the opposed ends thereof in fluid communication with the inlet passageway and an enlarged bore 20. The outlet 16 also communicates with bore 20 by means of an angled passage 22. Fluid may thus flow through inlet 14, orifice 18, bore 20, and exit via passage 22 and outlet 16.

Fluid flow through the valve is controlled by a small, delicate, tapered metering pin or needle 24 carried at the lower end of an elongated stem member 26. Axial movement of the stem 26 moves the tapered metering pin axially into and out of the orifice 18, thereby varying the annular flow area between the metering pin and orifice as is known in the valve art.

Stem 26 is threadedly engaged in a central bore 28 of a unitary of one-piece bonnet member 30 at mating threaded areas generally designated by numeral 32 located remote from the tapered metering pin 24. The stem extends outwardly from the outer end of the bonnet and receives a generally cylindrical adjusting handle 34. Handle 34 has a downwardly extending, open cylindrical boot portion 36 which enclosed an outer portion 38 of the bonnet. The adjusting handle is nonrotatably connected to the stem by convenient means such as a set screw 40 or the like. Manual rotation of the handle thus imparts rotary movement to the stem for axially shifting metering pin 24 in orifice 18 for adjusting the rate of fluid flow through the valve.

A second set screw 42 is provided in the boot portion 36 of the handle. Advancement of this second set screw locks the handle and stem in a predetermined position, thereby maintaining fluid flow through the valve at a constant rate. Loosening the set screw 42 allows variable flow metering by adjusting the handle.

Although not critical to the subject invention, bonnet 30 has an exteriorly threaded portion 50 for receiving a panel mounting nut 52. This provides secure mounting of the assembly as is known in the art. Located adjacent to threads 50 is a radially outward extending polygonal flange 54 defining wrench flats which facilitate removal of the bonnet from the valve body 12.

Figure 3:
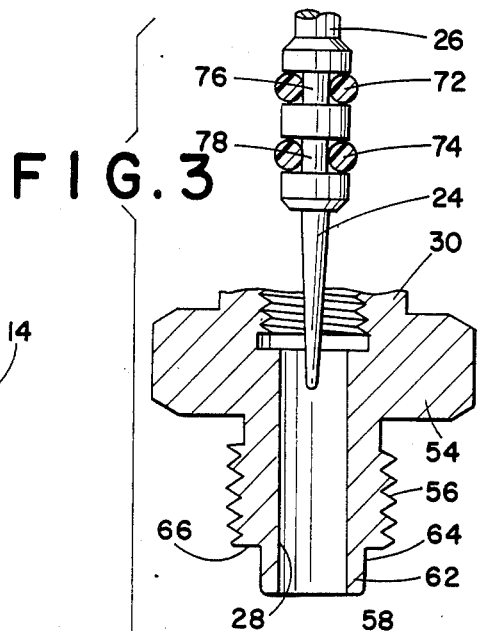
FIG. 3 is an enlarged, exploded cross-sectional view showing the lower portions of the stem and bonnet, and the upper portion of the valve body formed in accordance with the invention.

Referring also to FIG. 3, the lower end of the bonnet is provided with external threads 56 cooperable with an enlarged, threaded bore 58 extending into the valve body coaxial with bore 20. In addition, bore 58 has an unthreaded section 60 disposed axially adjacent bore 20.

Projecting axially outward from the nose end of the bonnet 30 is a cylindrical guide means 62. The outer surface 64 of guide means 62 is smoothly finished, and is spaced radially inward of threaded area 56 for closely received, aligning engagement with bore 20 (FIG. 2). A seal confining shoulder 66 is defined between threaded area 56 and outer surface 64.

An annular body seal 68 is closely interposed between the outer surface 64 of the guide means and the side wall of bore 60 in valve body 12. As seen in FIGS. 2 and 3, the body seal 68 rests on a radial shoulder 70 defined at the interface between bores 60 and 20. Seal 68 functions to provide a fluid tight seal between the body and bonnet when these components are placed in a fully assembled relationship. As the bonnet is threaded into bore 58, shoulders 66, 70 axially compress the body seal so that it radially expands to form a fluid tight seal between guide means outer surface 64 and the side wall of bore 60.

Stem 26 is provided with a pair of axially spaced O-rings 72, 74 received in corresponding stem grooves 76, 78 respectively. The O-rings provide a floating capability to the stem. Thus, when metering pin 24 comes into contact with the side wall of orifice 18, the force of such contact is appropriately dissipated, and concentric alignment between the metering pin and orifice is retained. Such capability greatly decreases the chances of galling or breaking the metering pin. In addition, the pair of O-rings prevent system fluid bypass between the stem and bonnet, and eliminate the need for additional stem packing structure.

According to the invention, the upper O-ring 72 is squeezed or compressed more tightly than lower O-ring 74. In fact, O-ring 72 is compressed to an extent which is greater than that recommended by the O-ring manufacturer for normal use. In the preferred embodiment here being described, O-ring 72 experiences a compression which is approximately twice the recommended compression. Such compression may readily be achieved by proper selection of the O-ring and proper dimensioning of groove 76.

To assemble the valve, stem 26 is threaded into the bonnet. The threaded engagement at area 32 provides a secure mounted relationship between the stem and bonnet. The unitary or one-piece bonnet 30 is then threaded into the valve body 12. External threads 56 interact with threaded bore 58 to retain the bonnet within the valve body. The use of a one-piece bonnet eliminates underdesirable tolerance stacking between these two mating parts.

By way of example, prior art devices use a two-piece bonnet to facilitate assembly of the valve. The first bonnet piece is threaded into engagement with the second bonnet piece. Because of this construction, there are some dimensional deviations in the bonnet component due to acceptable tolerances within the individual pieces. When the composite bonnet is, in turn, threaded into engagement with an associated valve body, still other dimensional deviations will occur. The combination of these deviations results in an assembly with greater overall tolerance problems, i.e., tolerance stacking. Use of the subject new one-piece bonnet advantageously decreases the foregoing tolerance stacking situation.

Also, centering of the stem with metering pin 24 coaxially disposed in orifice 18 occurs on guide means 62, and not on bonnet threads 56 as had heretofore been the case. Guide means 62 extends into close guiding contact with bore 20 for ensuring alignment of the metering pin 24 in the orifice. Reliance is not made solely on the threaded interconnection between the bonnet and valve body for effective centering of the metering pin. Body seal 68 is compressed between the smooth outer face 64 of the guide means and bore portion 60. Shoulder area 66 axially compresses and causes radial expansion of body seal 68 into a tight sealing condition when the bonnet is threadedly mounted to the valve body.

Handle 34 is then located over the outer end of stem 26 and bonnet outer portion 38. Set screw 40 is advanced into retaining contact with the stem so that subsequent handle rotation effects stem rotation with corresponding axial movement. Such axial movement accommodates adjustment of metering pin 24 in orifice 18 for controlling fluid flow through the valve. Set screw 42 is also inserted in the boot portion 36 of the handle for accommodating selective locking of the handle to bonnet outer portion 38.

Figures 4, 5:
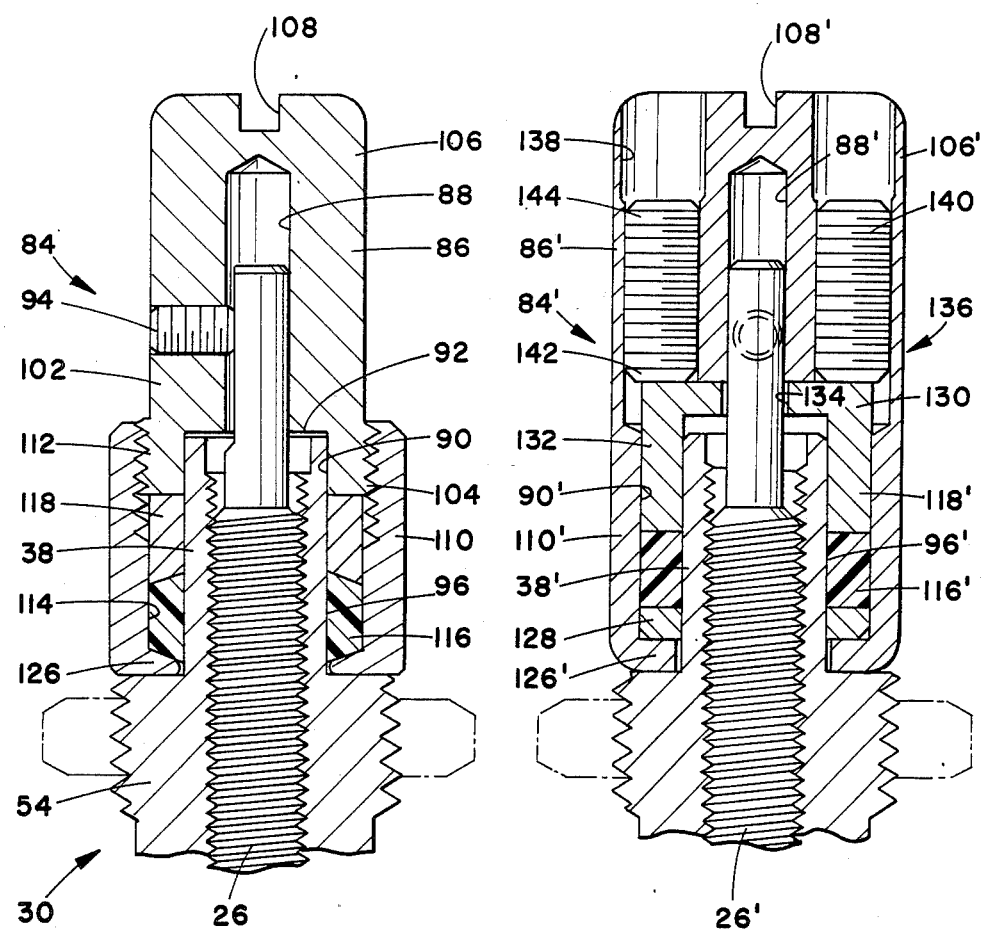
FIG. 4 is an enlarged cross sectional view of the upper portion of the metering valve showing a modified handle construction.
FIG. 5 is an enlarged cross sectional view of another alternative handle construction; and, FIG. 6 is a plan view in partial cross-section of the alternative handle construction of FIG. 5.

With reference to FIG. 4, a modified or alternative handle assembly 84 is shown. For ease of illustration, the elements of this modified handle assembly are identified by new numerals while the valve bonnet and stem assembly are identified by their previous numerals. In this particular embodiment, the handle assembly 84 includes a handle 86 having a first bore 88 and a concentric second bore counterbore 90 defining a radial shoulder 92 therebetween. The stem 26 is closely received in the bore 88, and conventional means such as set screw 94 maintains the handle and valve stem in non-rotatable connection. The counterbore 90 is adapted to closely receive an exterior surface 96 of bonnet outer portion 38.

A first or inner end 102 of the handle includes an exteriorly threaded portion 104, while a second or outer end 106 has a recess 108 adapted to receive the end of an appropriate, conventional tool for selectively rotating the handle. Typically, the metering valve is mounted in a generally inaccessible area such that recess 108 allows valve adjustment through use of a conventional handtool such as a screwdriver or the like.

In the FIG. 4 embodiment, the handle includes a handle extension 110 having an interior threaded portion 112 operatively engaging threaded portion 104. The handle assembly 84 is shown in the closed position wherein the handle extension 110 engages the bonnet 30 at the upper surface of polygonal flange 54. The handle extension is generally cylindrical having an inner surface 114 spaced radially from exterior surface 96 of the bonnet outer portion. An annular polymeric packing 116, preferably polytetrafluorethylene, is disposed between the bonnet outer portion and the handle extension. Likewise, packing gland 118 is annularly shaped and is disposed between the handle extension and valve bonnet. The packing 116 is engaged at one end by an inwardly extending flange 126 of the handle extension 110 and by packing gland 118 at the other end. The inwardly extending flange 126 may be preformed, or simply crimped to its radially inward configuration. The packing gland 118 is interposed between the packing 116 and the handle inner end 102.

Threaded engagement between the handle 86 and the handle extension 110 places the packing gland and packing in axial and radial compression. Thus, a predetermined threaded advancement of handle 86 in extension 110 causes radial expansion of packing 116, through gland 118, into close engagement with the inner surface of the handle extension and the exterior surface of the bonnet outer portion 38. Imposition of lateral loads on the handle assembly 84 is thereby dissipated due to the packing 116. This prevents transfer of forces to the valve stem which, in turn, advantageously reduces flow instability problems.

Figure 6:
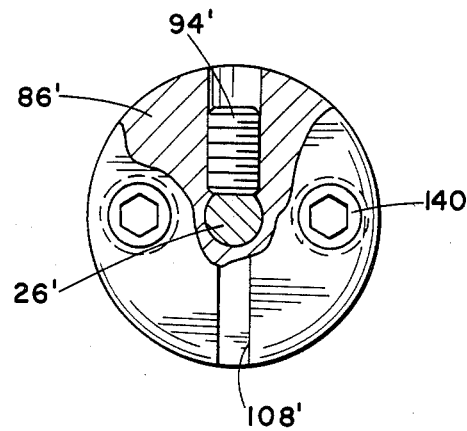

Turning to FIGS. 5 and 6, an alternative handle modification incorporates an adjustability feature therein. For ease of illustration, like elements are identified by like numerals with a primed (') suffix and new elements are identified by new numerals. A handle assembly 84' includes a handle 86' having a first bore 88' and a counterbore 90' therein. The first bore 88' closely receives an upper portion of stem 26' in non-rotatable relation. A set screw 94' or similar means maintains the handle in fixed, non-rotatable relation with the valve stem. The counterbore 90' receives the bonnet outer portion 38', polymeric packing 116', and packing gland 118', therein. In addition, washer 128 is received in the counterbore in abutting engagement with an inwardly extending flange 126'.

In this alternative embodiment, the handle extension 110' is integrally formed with the handle 86' so that the inner surface of the handle extension coincides with the counterbore 90'. The annular washer and polymeric packing are positioned between the handle extension and exterior surface 96' of the bonnet outer portion. The packing gland 118' is generally cup-shaped, having a base portion 130 with an annular sidewall portion 132 extending therefrom. The base portion includes an aperture 134 coaxial with first bore 88' to receive the valve stem therethrough. Additionally, a recess 108' is formed in a handle outer end 106' for selective cooperation with the end of an appropriate tool.

Means for adjusting the compression of the polymeric packing, packing gland, and washer in the handle extension is provided in the handle outer end 106'. More particularly, a pair of axially extending threaded apertures 138 are arranged diametrically in the handle to be on opposite sides of bore 88' and thus stem 26'. A pair of elongated threaded members 140 are threadedly received in threaded apertures 138 for abutting engagement with the base portion 130 of the packing gland. A first or inner end 142 abuts the base portion while a second or outer end 144 is designed for receipt of an appropriate, conventional tool or wrench.

Rotation of the handle 86' causes rotational and axial movement of the valve stem relative to the valve bonnet. The polymeric packing 116' slides along the bonnet exterior surface 96' dissipating any loads imposed laterally on the handle. This, in turn, prevents transmission of lateral forces to the upper portion of the valve stem 26'.

The polymeric packing has a tendency to cold flow after continued use so that the effectiveness in limiting the lateral movement of the valve stem is reduced. In that event, an operator need only rotate the elongated threaded members 140 in their respective apertures 138 for producing increased axial and radial compression of packing 116'. Adjusting the compression of the packing only affects the arrangement of the handle assembly 84'. The dead stop position of the valve member, which is preset at the factory, is not affected or altered by adjusting the handle packing.

Referring again to FIGS. 1-3, inadvertent contact of the metering pin 24 with the sidewall of the orifice 18 generates forces which, necessarily, pass through the delicate metering pin. As alluded to above, breakage of the pin, or at least galling thereof, was the usual result. With the subject invention these deficiencies are eliminated, or at least substantially reduced.

Compression of the outermost O-ring 72 is significantly above, approximately twice, the manufacturer's recommendation in order to provide a more stable structure. It is to be appreciated, however, that other compression relationships may be suitably employed to accommodate other valve constructions and environments without departing from the overall intent or scope of the invention. Thus, the double O-rings 72, 74 (FIGS. 1-3), and the modified handle assemblies 84 (FIG. 4), 84' (FIGS. 5 and 6), allow the stem to float, retain a stable valve structure, and prevent fluid leakage between the stem and bonnet.

In the preferred embodiment, the bonnet, valve handle, and panel nut body are constructed of stainless steel. The stem is also constructed of stainless steel but preferably of a different grade. The body seal and O-rings are of a resilient material with VITON, a registered trademark of E. I. DuPont de Nemours & Co., having been used with success. A wide range of other materials may advantageously be used to accommodate a variety of valve applications and environments without departing from the scope and intent of the subject invention.

Comparative tests have established that increased stability is realized with the subject new metering valve design. In addition, use of a pair of O-rings eliminates the need for a stem packing that normally is disposed in the valve bonnet. This, in turn, dispenses with any packing adjustment which would necessitate valve disassembly. The modified handle assembly limits stem lateral movement and provides a simplified packing that may be adjusted without valve disassembly. The prior art type of stem packing was a source of still other problems. The delicate metering pin was unable to deform the stiff packing material when misalignment was present. The addition of a second O-ring to the subject invention retains a double stem seal and provides a smooth, stable stroke. Moreover, stem damage due to misalignment which is prevalent in the prior art assemblies is greatly reduced. The plural O-rings allow the stem to float while providing a valve stabilizing effect. This results in a longer cycle life for the valve, as well as the use of fewer component parts. The various tests directed to flow range, stability, and cycle life of the subject new valve indicate a more linear response between the flow range and the valve turns of the handle. Better low end metering is also obtained in addition to a lower dead stop setting and a more consistent number of turns at full open.

The alternate handle assemblies facilitate actuation even if the valve is positioned in a generally inaccessible area. An appropriate tool end can be used to remotely adjust the flow rate along with the handle packing from an outer end of the metering valve. Adjusting the handle packing has no affect on the preset dead stop setting of the new valve design.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A metering valve comprising:
   a body having inlet and outlet passageways;
   an orifice interposed between said inlet and outlet passageways in said body for accommodating fluid flow therebetween;
   a stem having inner and outer ends;
   a metering pin extending coaxially from said stem inner end being axially shiftable in said orifice for regulating fluid flow from said inlet passageway to said outlet passageway;
   a bonnet secured to said body and having said stem threadedly connected thereto, said bonnet further having an upper portion for receiving a handle;
   means interposed between said stem and said bonnet for absorbing forces caused by said metering pin contacting the side wall of said orifice;
   said handle received over said bonnet upper portion and non-rotatably received on said stem outer end, selective rotation of said handle causing rotation of said stem and axial shifting of said metering pin relative to said orifice; and,
   means disposed along an exterior surface of said bonnet and radially confined between said bonnet and said handle for limiting lateral movement of said stem outer end relative to said bonnet upper portion, said limiting means including a polymeric packing and a packing gland disposed along an exterior surface of said bonnet upper portion.

2. The metering valve as defined in claim 1 wherein said handle includes an extension sleeve extending axially outward from one end thereof, said extension sleeve receiving said bonnet upper portion and limiting means therein.

3. The metering valve as defined in claim 2 wherein said extension sleeve includes a radially inward extending flange at one end for retaining said limiting means therein.

4. The metering valve as defined in claim 1 wherein said extension sleeve is integral with said handle, said extension sleeve including a radially inward extending crimped end for retaining said limiting means therein.

5. A metering valve comprising:
   a body having inlet and outlet passageways;
   an orifice interposed between said inlet and said outlet passageways for accommodating fluid flow therebetween;
   a stem having inner and outer ends;
   a metering pin extending coaxially from said stem inner end being axially shiftable in said orifice for regulating fluid flow from said inlet passageway to said outlet passageway;
   a bonnet secured to said body and having said stem threadedly connected thereto, said bonnet further having an upper portion for receiving a handle thereon, said handle including an extension sleeve extending axially outward from one end thereof and receiving said bonnet therein;
   means interposed between said stem and bonnet for absorbing forces caused by said metering pin contacting the side wall of said orifice;
   said handle received over said bonnet upper portion and non-rotatably received on said stem outer end, selective rotation of said handle causing rotation of said stem and axial shifting of said metering pin relative to said orifice; and, an annular packing and a generally cup-shaped packing gland compressibly interposed between said handle and a radially inward extending flange at one one of and along an inner surface of said extension sleeve and along an exterior surface of said bonnet for limiting lateral movement of said stem outer end relative to said bonnet upper portion.

6. The metering valve as defined in claim 5 further including means for adjusting the compression of said packing and packing gland.

7. The metering valve as defined in claim 5 wherein said adjusting means includes a threaded member operatively engaged with said handle and in abutting relation with said cup-shaped packing gland, whereby rotation of said threaded member relative to said handle axially compresses and radially expands said packing.

8. A handle assembly for resisting lateral movement of a valve stem, said handle assembly comprising:
a generally cylindrical handle having first and second bores adjacent one end thereof, said second bore having a greater diameter than said first bore;
a valve stem received in said first bore in non-rotative relation with said handle;
a valve bonnet having an opening therethrough for closely receiving said valve stem, said valve bonnet being received in said handle second bore in a manner adapted for allowing relative rotation therebetween;
means disposed along an exterior surface of said valve bonnet for limiting lateral movement of said valve stem, said limiting means being compressed between said valve bonnet and said handle; and,
means for selectively adjusting the compression of said limiting means.

9. The handle assembly as defined in claim 8 further including means for securing said handle in non-rotative relation with said valve stem.

10. The handle assembly as defined in claim 8 wherein said handle includes an extension sleeve at one end thereof for receiving said valve bonnet therein whereby said limiting means is interposed between an exterior surface of said valve bonnet and said extension sleeve.

11. The handle assembly as defined in claim 10 wherein said limiting means includes an annular polymeric packing and a packing gland.

12. The handle assembly as defined in claim 10 wherein said extension sleeve includes an internal threaded portion adjacent one end operatively engaging said handle one end.

13. The handle assembly as defined in claim 12 wherein said extension sleeve includes a radially inward extending flange at another end for axially retaining said limiting means between said flange and said handle one end.

14. The handle assembly as defined in claim 10 wherein said extension sleeve is integrally formed with said handle and includes a radially inward extending flange at another end for axially retaining said limiting means between said inwardly extending flange and said handle one end.

15. A handle assembly for resisting lateral movement of a valve stem, said handle assembly comprising:
a generally cylindrical handle having first and second bores adjacent one end thereof with an extension sleeve defining said second bore at one end thereof;
said second bore having a greater diameter than said first bore;
a valve stem received in said first bore in non-rotative relation with said handle;
a valve bonnet having an opening therethrough for closely receiving said valve stem, said valve bonnet being received in said handle second bore and extension sleeve in a manner adapted for allowing rotation therebetween; and,
an annular polymeric packing, generally cup-shaped packing gland and an annular washer interposed between an exterior surface of said valve bonnet and said extension sleeve for limiting lateral movement of said valve stem.

16. The handle assembly as defined in claim 15 wherein said cup-shaped packing gland is dimensioned for closely receiving said valve bonnet, and an aperture in a base portion of said cup-shaped packing gland receives said valve stem therethrough.

17. The handle assembly as defined in claim 16 wherein said adjusting means includes an elongated member having one end thereof engaging said packing gland base portion, whereby advancement of said elongated member in said handle produces relative axial movement between said packing gland and said handle.

18. The handle assembly as defined in claim 16 wherein said adjusting means includes a pair of set screws diametrically disposed in said handle and extending in parallel relation with said valve stem for operative abutting engagement with said packing gland base portion.

19. A handle assembly for actuating a valve stem in an associated valve, said handle assembly including:
a generally elongated cylindrical handle having a first centrally disposed bore for receiving a valve stem therein;
said handle having a counterbore concentrically disposed with said first bore;
a valve bonnet received in said counterbore, said bonnet including a stem opening extending therethrough for receiving said valve stem; and,
a polymeric packing and a packing gland interposed between an exterior surface of said valve bonnet and an interior surface of said handle whereby lateral movement between said handle and stem is limited.

20. The handle assembly as defined in claim 19 wherein one end of said handle operatively engages one end of an extension sleeve, said extension sleeve including a radial inward flange at another end for retaining said polymer packing and said packing gland between said handle one end and said inward flange.

21. The handle assembly as defined in claim 19 wherein one end of said handle forms an extension sleeve member having a radial inward flange for retaining said polymeric packing, said packing gland, and a washer therein.

22. The handle assembly as defined in claim 21 further including means for adjusting the compression of said polymeric packing and packing gland, said adjusting means having at least one threaded member cooperating with a threaded bore in said handle and abutting said packing gland at one end thereof, whereby selective axial movement of said threaded member compresses said polymeric packing and said packing gland against said inward flange.

* * * * *